United States Patent
Matsumoto et al.

(10) Patent No.: US 6,950,583 B2
(45) Date of Patent: *Sep. 27, 2005

(54) TWO-DIMENSIONAL OPTICAL ELEMENT ARRAY, TWO DIMENSIONAL WAVEGUIDE APPARATUS AND METHODS FOR MANUFACTURING THE SAME

(75) Inventors: Akira Matsumoto, Nagoya (JP); Masashi Fukuyama, Inuyama (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 314 days.

This patent is subject to a terminal disclaimer.

(21) Appl. No.: 10/322,929

(22) Filed: Dec. 18, 2002

(65) Prior Publication Data

US 2003/0123792 A1  Jul. 3, 2003

Related U.S. Application Data

(60) Provisional application No. 60/344,839, filed on Dec. 21, 2001.

(51) Int. Cl.$^7$ .................................................. G02B 6/04
(52) U.S. Cl. ........................... 385/120; 385/83; 385/137
(58) Field of Search .............................. 385/49, 65, 83, 385/120, 134–137

(56) References Cited

U.S. PATENT DOCUMENTS 6,826,347 B2 * 11/2004 Matsumoto et al. ........ 385/137

* cited by examiner

Primary Examiner—Phan T. H. Palmer
(74) Attorney, Agent, or Firm—Burr & Brown

(57) ABSTRACT

A two-dimensional optical element array is provided, including a two-dimensional integrated body or two-dimensional stack of a plurality of sets of an optical fiber and a substrate. The substrate has one or more grooves each suited to a profile of the optical fiber on one surface thereof, and one or more optical fibers are aligned and fixed in the grooves. An end face of the substrate and optical fiber from which light is outgoing or incoming is slanted by a predetermined angle (θ) with respect to a plane perpendicular to a central axis of the optical fiber.

29 Claims, 12 Drawing Sheets

ENLARGED VIEW OF PORTION A

TWO-DIMENSIONAL OPTICAL ELEMENT ARRAY, TWO DIMENSIONAL WAVEGUIDE APPARATUS AND METHODS FOR MANUFACTURING THE SAME

BACKGROUND OF THE INVENTION AND RELATED ART STATEMENT

The present invention relates to a two-dimensional optical element array, a two-dimensional waveguide apparatus and methods for manufacturing them. Specifically, this invention relates to a two-dimensional optical element array which is inexpensive and has superior reflection characteristics of end faces, from which light is outgoing or incoming, of optical elements (optical fiber, lens, for example) on a substrate, and can maintain the superior reflection characteristics for a long period and prevent a loss of quantity of light and an adverse effect to another device, a two-dimensional waveguide apparatus having high density and capacity and allowing the number of steps in packaging or connection to be reduced, and efficient methods for manufacturing them.

Recently, with the increased communications data capacity, a demand for an optical cross-connect switch technique that provides a higher throughput of communications data has been increased. For example, there has been used an optical switch that is manufactured using the MEMS (micro-electro-mechanical-system) for conducting fine machining in a semiconductor process including silicon etching, which is used for micro-machining and the like. Besides, with the increased demand for reliability, as well as the demand for the higher throughput, a surface-emitting laser enabling communications with high definition and stability has come into common use.

In such an optical switch or surface-emitting laser, there is used an optical element array (such as, for example optical fiber array, lens array, waveguide array (PLC), semiconductor laser (LD) array, photo diode (PD) array, and the like. Thus, the description will be made, hereinafter, by taking "optical fiber array" as an example of the optical element array). In consideration of requirements for increased throughput and space-saving, the optical fiber array is a so-called two-dimensional optical fiber array (occasionally abbreviated as 2DFA hereinafter) whose cross-section taken along a plane perpendicular to central axes of the aligned optical fibers has a two-dimensional (hierarchical) configuration.

For example, as shown in FIG. 14, there has been proposed a conventional two-dimensional optical fiber array 100 with a pitch in a thickness direction determined by controlling a thickness of a substrate 102 with V-shaped grooves with high precision, arranging optical fibers 101 between the substrates 102 with V-shaped grooves and between the uppermost substrate 102 with V-shaped grooves and the fixing member 103, and stacking the substrates in such a manner that a front surface of each substrate 102 with V-shaped grooves is brought into contact with a back surface of the adjacent substrate 102 with V-shaped groove (for example, JP-A-56-113114).

An optical communication network involving such two-dimensional optical fiber arrays has various connection points therein. If some of the reflected light passing through such connection points is reflected back into the original fiber at time of passing each reflect connection point, a laser or the like is adversely affected (noise occurs, for example).

In particular, in the case of the 2DFA mainly used for the MEMS switch or the like, since lens coupling is often adopted, and a space is provided immediately after the 2DFA. Thus, the degree of the reflection at that point becomes large, and resultantly, the influence caused by light being reflected back into the original fiber again becomes quite serious.

To eliminate the disadvantage described above, in the past, reflection from an end face has been suppressed by providing an AR coating (which is formed by stacking an $SiO_2$ film and a $TiO_2$ film each having a thickness of $\frac{1}{4}\lambda$ and has a total thickness of the order of a wavelength of light ($\lambda$)) on the substrate and an end face, from which light is outgoing or incoming, of the optical element, thereby enhancing reflection characteristics at the end faces.

A waveguide substrate (unit) 205 having one or more waveguides 201 patterned near a surface thereof, shown in FIG. 15, has been used in a splitter, AWG or waveguide modulator, for example. FIG. 15(a) is a schematic plan view of a splitter with one channel input and eight channel outputs, and FIG. 15(b) is a cross-sectional view taken along a line X—X in FIG. 15(a).

However, the conventional two-dimensional optical fiber arrays have problems as described below. The AR coating film is easily degraded by effects of temperature, humidity and other environmental factors and adversely affects the reflection characteristics. Recently, in particular, with the development of the wavelength division multiplex (WDM) communication, the quantity of light transmitted through one optical fiber has been increased, and accordingly, the possibility of a local change in characteristics or local degradation due to the increased quantity of light (light with increased intensity) has been increased. Besides, since the AR coating is provided on the end face of the fiber array when the fibers are mounted thereon, it is difficult to use a vacuum processing for vapor deposition of the AR coating. Thus, multiple AR coatings cannot be conducted at a time, and the cost is increased.

In addition, the above-described waveguide substrate has a problem as follows. When connecting the waveguide substrates and the optical fiber arrays with each other, each of the optical fiber arrays needs to be optically aligned with one of the waveguide substrates. In this alignment, the waveguide substrate and the optical fiber array are aligned with each other on the level of submicrons, and thus, the alignment inevitably requires extremely high precision and many process steps.

The present invention has been devised in view of the above-describe problems, and an object of this invention is to provide an inexpensive two-dimensional optical element array which has superior reflection characteristics of end faces, from which light is outgoing or incoming, of optical elements on a substrate, and can maintain the superior reflection characteristics for a long period and prevent a loss of quantity of light and an adverse effect to another device, a two-dimensional waveguide apparatus having high density and capacity and allowing the number of steps in packaging or connection to be reduced, and efficient methods for manufacturing them.

SUMMARY OF THE INVENTION

After the earnest research, the inventor has found that the above problems can be solved by slanting an end face, from which light is outgoing or incoming, of a substrate and optical element by a predetermined angle ($\theta$) with respect to a plane perpendicular to a central axis of the optical element (the same applies to a waveguide patterned in a planar manner). Thus, this invention has been completed.

Specifically, the present invention provides a two-dimensional optical element array, a two-dimensional waveguide substrate apparatus, and methods for manufacturing them described below.

There is provided a two-dimensional optical element array, comprising: a two-dimensional integrated body or two-dimensional stack of a plurality of set of an optical element and a substrate, the substrate having one or more grooves each suited to a profile of the optical element on one of surfaces thereof, and one more optical elements being aligned and fixed in the grooves, characterized in that an end face, from which light is outgoing or incoming, of each of the plurality of optical elements is slanted by a predetermined angle (θ) with respect to a plane perpendicular to a central axis of the optical element.

It is preferable that the end face, from which light is outgoing or incoming, of the optical element is disposed in the plane perpendicular to the central axis of the optical element.

It is also preferable that the end face, from which light is outgoing or incoming, of the optical element is disposed in a plane angled by a predetermined angle (θ) with respect to the plane perpendicular to the central axis of the optical element.

It is also preferable that the end face, from which light is outgoing or incoming, of the optical element is disposed in a plane perpendicular to an optical axis of an outgoing light and/or incoming light, respectively.

It is also preferable that the end face, from which light is outgoing or incoming, of the optical element is disposed in a plane perpendicular to an optical axis of an outgoing light and/or incoming light, respectively.

It is also preferable that the two-dimensional optical element array comprises a stack of optical element array units each comprising a set of the optical element and the substrate.

It is preferable that an apex of an optical element arranged on a substrate of a first optical element array unit is brought into contact with a surface of a substrate of a second optical element array unit both of which face each other, but that the surfaces of the substrates of two adjacent optical element array units do not directly contact each other, and that the two adjacent units do not have a direct mechanical influence on each other in the two-dimensional optical element array.

It is preferred to stack the plurality of optical element array units in such a manner that an adhesive layer is interposed between an apex of an optical element arranged on the substrate of a first optical element array units and a surface of a substrate of a second optical element array unit both of which face each other, that the apex of an optical element arranged on a substrate of a first optical element array unit is brought into contact with a surface of a substrate of a second optical element array unit such that both substrates of the first and second units face each other, but such that the surfaces of the substrates of two adjacent optical element array units do not directly contact each other, and that the two adjacent units do not have a direct mechanical influence on each other in the two-dimensional optical element array.

There is also provided a two-dimensional optical element array, which further comprises a fixing member on one of surfaces of the substrate of the uppermost optical element array unit and between the substrates of adjacent optical element array units, the fixing member pressing or mounting the optical element against or on one surface with the grooves of the substrate for alignment and fixing.

There is further provided a two-dimensional optical element array of which optical element is pressed against or mounted on the substrate for alignment and fixing in such a manner that the optical element abuts on a surface of the fixing member and on a side wall of the groove(s).

It is also preferable that the optical element array unit(s) further comprise(s) an adhesive layer disposed between the surface of the fixing member and the surface of the substrate of the optical element array unit which faces to the surface of the fixing member.

It is also preferable that a thickness of the adhesive layer falls within a range from 2 to 100 µm.

It is also preferable to form a positioning guide at a predetermined position on the surface with the grooves of the substrate of the optical element array unit.

It is also preferable that the groove is a V-shaped groove.

There is provided a method of manufacturing a two-dimensional optical element array, comprising: a step of aligning and fixing one or more optic elements on a substrate having, on one surface thereof, one or more grooves each suited to a profile of the optical element; and a step of integrating or stacking a plurality of sets of the substrate and the one or more optical elements to provide a two-dimensional configuration, characterized in that an end face, from which light is outgoing or incoming, of each optical element is slanted by a predetermine angle (θ) with respect to a plane perpendicular to a central axis of the optical element.

It is also preferable to dispose the end face, from which light is outgoing or incoming, of the optical element in the plane perpendicular to the central axis of the optical element.

It is also preferable to dispose the end face, from which light is outgoing or incoming, of the optical element in a plane angled by a predetermined angle (θ) with respect to the plane perpendicular to the central axis of the optical element.

It is also preferable to dispose the end face, from which light is outgoing or incoming, of the optical element in a plane perpendicular to an optical axis of an outgoing light and/or incoming light, respectively.

There is provided a two-dimensional waveguide apparatus, comprising: a two-dimensional integral body or two-dimensional stack of a plurality of waveguide substrate units each having one or more waveguides patterned in a planar manner, characterized in that an end face, from which light is outgoing or incoming, of each waveguide of the waveguide substrate unit is slanted by a predetermined angle (θ) with respect to a plane perpendicular to a central axis of the waveguide.

It is preferable that the end face, from which light is outgoing or incoming, of the waveguide of the waveguide substrate unit is disposed in a plane perpendicular to a central axis of the waveguide.

It is also preferable that the end face, from which light is outgoing incoming, of the waveguide of the waveguide substrate unit is disposed in a plane angled by a predetermined angle (θ) with respect to the plane perpendicular to the central axis of the waveguide.

It is also preferable that the end face, from which light is outgoing or incoming, of the waveguide of the waveguide substrate unit is disposed in a plane perpendicular to an optical axis of an outgoing light and/or incoming light, respectively.

There is further provided a two-dimensional waveguide apparatus which further comprises an adhesive layer between the surfaces facing each other of two adjacent waveguide substrate units of the plurality of waveguide substrate units.

It is preferable that a thickness of the adhesive layer falls within a range from 2 to 100 µm.

It is also preferable to form a positioning guide at a predetermined location on a surface of the waveguide substrate unit.

There is provided a method of manufacturing a two-dimensional waveguide apparatus, comprising: a step of integrating or stacking a plurality of waveguide substrate units each having one or more waveguides patterned in a planar manner to provide a two-dimensional configuration, characterized in that an end face, from which light is outgoing or incoming, of each waveguide is slanted by a predetermined angle (θ) with respect to a plane perpendicular to a central axis of the waveguide.

There is further provided a method of manufacturing a two-dimensional waveguide apparatus, in which the end face, from which light is outgoing or incoming, of the waveguide of the waveguide substrate unit is disposed in a plane perpendicular to a central axis of the waveguide.

There is also provided a method of manufacturing a two-dimensional waveguide apparatus in which the end face, from which light is outgoing or incoming, of the waveguide of the waveguide substrate unit is disposed in a plane angled by a predetermined angle (θ) with respect to the plane perpendicular to the central axis of the waveguide.

There is also provided a method of manufacturing a two-dimensional waveguide apparatus in which the end face, from which light is outgoing or incoming, of the waveguide of the waveguide substrate unit is disposed in a plane perpendicular to an optical axis of an outgoing light and/or incoming light, respectively.

BRIEF DESCRIPTION OF THE DRAWINGS

FIGS. 10(a) and 10(b) schematically show one embodiment of a two-dimensional waveguide apparatus of this invention, in which FIG. 10(a) is a plan view and FIG. 10(b) is a cross-sectional view taken along a line Y—Y in FIG. 10(a);

FIGS. 15(a) and 15(b) schematically show one example of a conventional two-dimensional waveguide apparatus, in which FIG. 15(a) is a plan view and FIG. 15(b) is a cross-sectional view taken along a line X—X in FIG. 15(a).

DETAILED DESCRIPTION OF THE INVENTION

Figure 1:
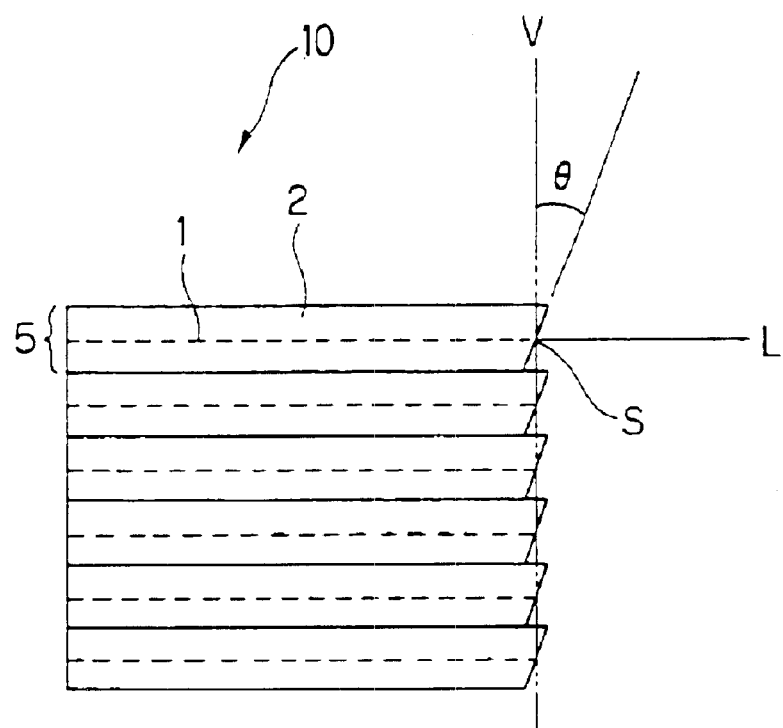
FIG. 1 is a schematic cross-sectional view of a two-dimensional optical fiber array, which is a first embodiment of a two-dimensional optical element array according to this invention.

Now, referring to the drawings, embodiments of a two-dimensional optical element array and a method of manufacturing the same of this invention will be described specifically with respect to a case where an optical element is constituted by an optical fiber, for example.

Figure 2:
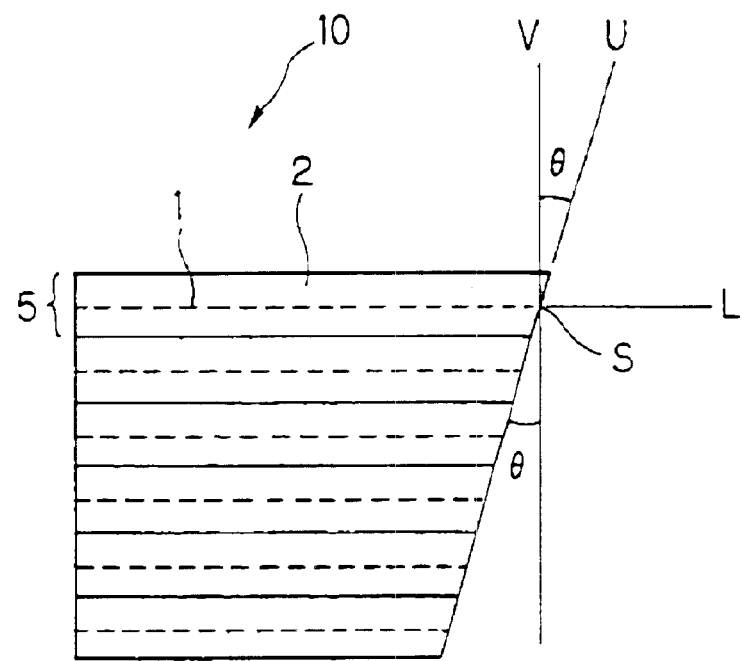
FIG. 2 is a schematic cross-sectional view of a two-dimensional optical fiber array, which is a second embodiment of the two-dimensional optical element array according to this invention.

FIG. 1 is a schematic cross-sectional view of a two-dimensional optical fiber array, which is a first embodiment of the two-dimensional optical element array according to this invention. FIG. 2 is a schematic cross-sectional view of a two-dimensional optical fiber array, which is a second embodiment of the two-dimensional optical element array according to this invention.

As shown in FIG. 1, a two-dimensional optical fiber array 10 according to the first embodiment comprises a two-dimensional integrated body or two-dimensional stack of a plurality of sets of an optical fiber 1 and a substrate 2, the substrate 2 has one or more grooves (not shown) each suited to a profile of the optical fiber 1 on one of surfaces thereof, and one or more optical fibers 1 are aligned and fixed in the grooves. In each of a plurality of optical element array units 5, an end face S, from which light is outgoing or incoming, of the substrate 2 and optical fiber 1 is slanted by a predetermined angle (θ) with respect to a plane V perpendicular to a central axis L of the optical fiber. While FIG. 1 shows a two-dimensional stack of a plurality of optical fibers 1 and substrates 2, they may be formed into an integrated body. In addition, while only the end faces S, from which light is outgoing, of the optical fibers are slanted, the end faces, from which light is incoming, thereof may be slanted, or both the end faces from which light is outgoing and the end faces from which light is incoming may be slanted.

With such an arrangement, the reflection characteristics of the end face, from which light is outgoing or incoming, of the optical element (optical fiber) on the substrate can be enhanced and maintained for a long period, and a loss of quantity of light and an adverse effect to another device can be prevented. That is, the light is reflected toward the outside of the optical fiber core, so that it is not launched into the original fiber, and thus, good reflection characteristics can be attained. In addition, since, in order to enhance the reflection characteristics, the optical fiber is directly machined to have a slanting on end face from which light is outgoing or incoming, any peeling or degradation, which would be found in the AR coating film, does not occur. For an intense light, it is only a matter of durability of the optical fiber, and the slanting itself is not a disadvantage. Besides, the slanting end face can be formed by simply polishing the end face in a slanting direction, and therefore, is superior in cost.

In this case, the end faces S from which light is outgoing and/or end faces from which light is incoming, of the optical fibers 1 may be disposed in the plane V perpendicular to the central axes L of the optical fibers 1, as in the first embodiment shown in FIG. 1. Alternatively, as in the second embodiment shown in FIG. 2, the end faces S from which light is outgoing and/or end faces from which light is incoming of the optical fibers 1 may be disposed in a plane U angled at a predetermined angle (θ) with respect to the plane V perpendicular to the central axes L of the optical fibers 1. Also in the second embodiment shown in FIG. 2, the end faces from which light is incoming, rather than the end faces S from which light is outgoing may be slanted, or both end faces S from which light is outgoing and the end faces from which light is incoming may be slanted. In addition, while the end faces are slanted by a predetermined angle in a column direction (thickness direction) in FIGS. 1 and 2, the end faces may be slanted in a row direction (width direction).

As described above, the 2DFA often involves lens coupling, for which a close investigation of the optical system is required. For example, in the case where light is launched into a lens in a slanting direction, an allowable limit of an angle deviation (<θ) (which is a deviation of an optical axis of a planar microlens from the optical axis of the outgoing light from the optical fiber (light launched into the planar microlens)) is on the order of 15 degrees, although depending on characteristics of the lens (if the light is launched into the lens at a right angle, <θ=0°). If the angle deviation (<θ) is larger than 15 degrees, the coupling has to be accomplished with a closer tolerance, and a loss occurs in practical. Therefore, from the viewpoint of operability of the optical system, the angle deviation (<θ) is preferably 10 degrees or less.

Figure 3:
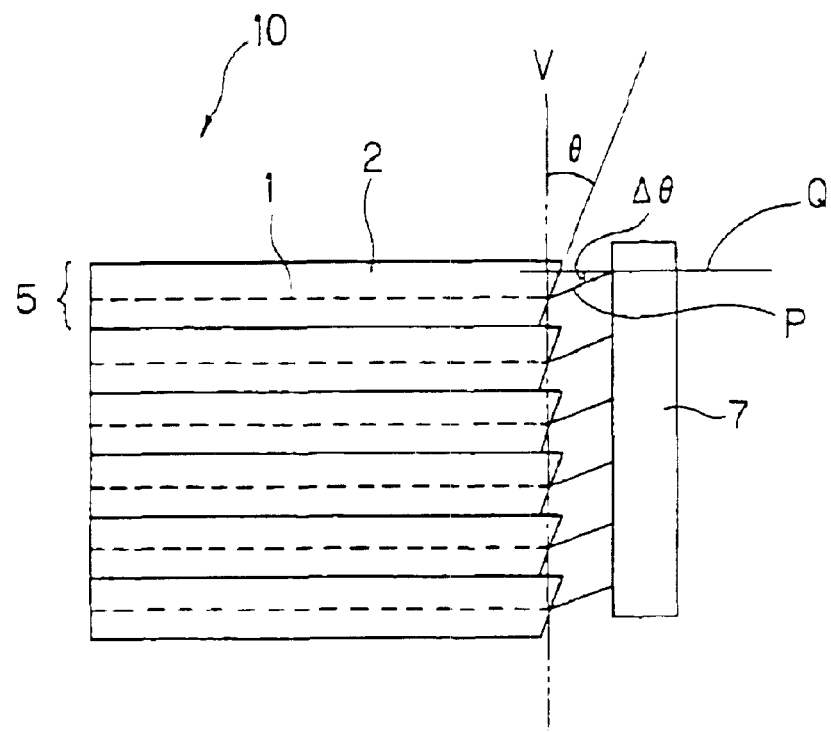
FIG. 3 is a cross-sectional view illustrating a relationship between reflection characteristics and an angle deviation (<θ) in the first embodiment.

As shown in FIG. 3, in the first embodiment shown in FIG. 1, if the slant angle θ of the end faces S of the optical fibers 1 is set at 8 degrees, and a common quartz SM fiber (with a refractive index of 1.45) and a planar microlens 7 are used for spatial lens coupling, an equal focal length can be attained for the optical fibers 1 without slanting the planar microlens 7, because the end faces S of the optical fibers 1 that outgoing light is arranged in the plane V perpendicular to the central axes L thereof. In this case, if conditions are the same as conventional, the angle deviation (<θ) is small, specifically 3.6 degrees, which facilitates coupling with high efficiency.

Here, the angle deviation (<θ) can be calculated from the following equation (1).
(Equation 1)

$$<\theta = -\sin^{-1}(1.45 \times \sin\theta) + \theta \quad (1)$$

If the angle θ is set at 8 degrees, the angle deviation (<θ) of the optical axis Q of the planar microlens from the optical axis P of the outgoing light from the optical fiber 1 is 3.6 degrees from the equation (1).

Figure 4:
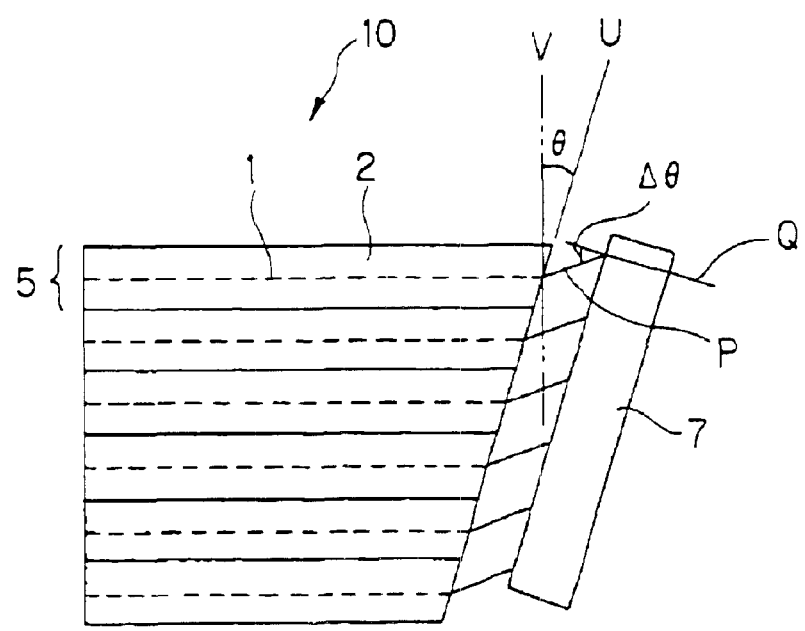
FIG. 4 is a cross-sectional view illustrating a relationship between reflection characteristics and an angle deviation (<θ) in the second embodiment.

As shown in FIG. 4, in the second embodiment shown in FIG. 2, if the angle θ is similarly set at 8 degrees, and a common quartz SM fiber (with a refractive index of 1.45) is used for spatial lens coupling, the angle deviation (<θ) of the optical axis Q of the planar microlens from the optical axis P of the outgoing light from the optical fiber 1, calculated from the equation (1), is 11.6 degrees. In this case, to provide an equal focal length for the optical fibers, the planar microlens 7 shown is slanted to be parallel to the end faces S of the optical fibers, that is, by 8 degrees.

To prevent light from being reflected back to (launched again into) the end face S of the optical fiber in the 2DFA, if a common quartz fiber is used, it is only needed to provide the slant angle of the end face equal to or more than 8 degrees. Besides, to provide the angle deviation (<θ) equal to or less than 15 degrees, if the common quartz fiber is used, it is only needed to provide the slant angle θ of the end face of the optical fiber equal to or less than 28 degrees in the first embodiment shown in FIG. 1, or to provide the slant angle of the end face of the optical fiber equal to or less than 15 degrees in the second embodiment shown in FIG. 2. Furthermore, to provide the angle deviation (<θ) equal to or less than 10 degrees, it is only needed to provide the slant angle θ equal to or less than 20 degrees in the first embodiment.

Figure 5:
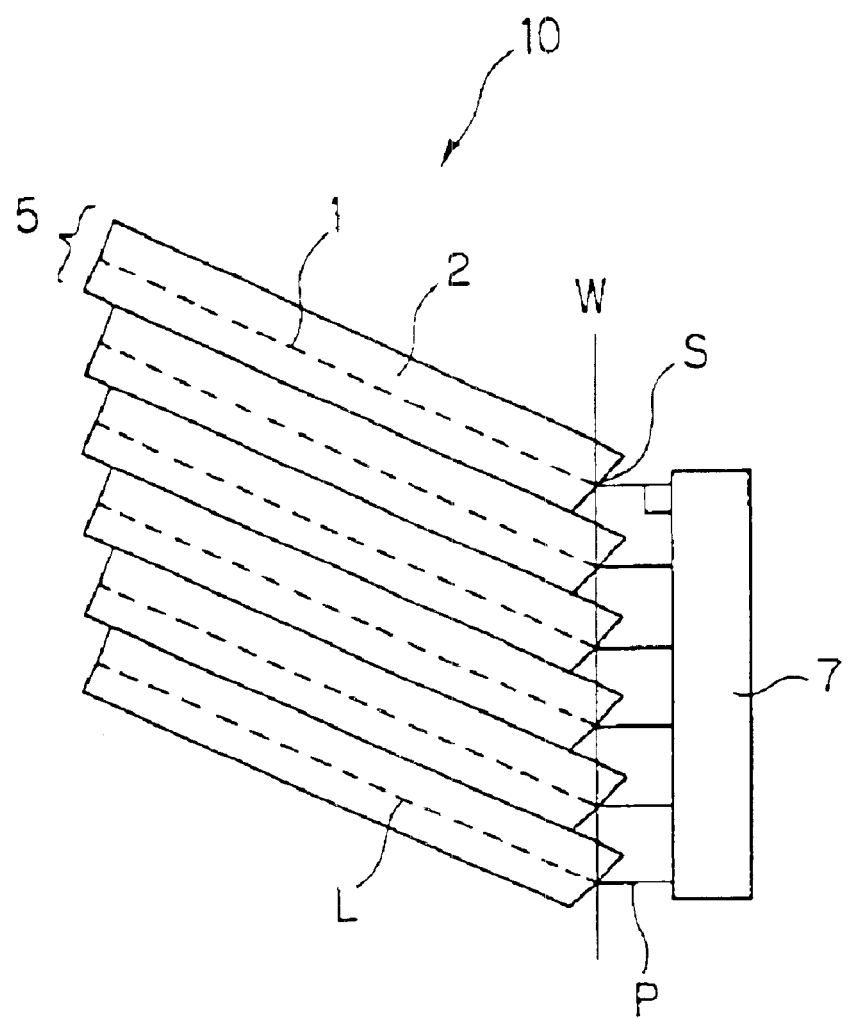
FIG. 5 is a schematic cross-sectional view of a two-dimensional optical fiber array, which is a third embodiment of the two-dimensional optical element array according to this invention.

FIG. 5 is a schematic cross-sectional view of a two-dimensional optical fiber array, which is a third embodiment of the two-dimensional optical element array according to this invention. As shown in FIG. 5, the end faces S from which light is outgoing and/or end faces from which light is incoming of the optical fibers 1 maybe arranged in a plane W perpendicular to the optical axis P of the incoming or outgoing light. Here, FIG. 5 shows a case where the end faces S from which light is outgoing are arranged in the plane W perpendicular to the optical axis P of the outgoing light.

In any embodiment described above, a lens array in the planar microlens 7 typically has a regular pitch. If the orientations and angles of the angled layers are different from each other, the light beams are not incoming or outgoing from the respective layers light with a regular pitch, and thus, the orientations and angles of the respective angled layers are preferably the same.

A recent cross-connect switch has been required to realize extremely quick switching. If there are variations in switching optical path length, variations in switching time disadvantageously result. Thus, it is important to provide an equal switching optical path length. While a conventional arrangement results in variations in the switching optical path length, the present invention can provide an equal switching optical path length. It can be said that the present invention is particularly advantageous in an application where an equal optical path length is required as in the case shown in FIG. 3.

Figure 6A:
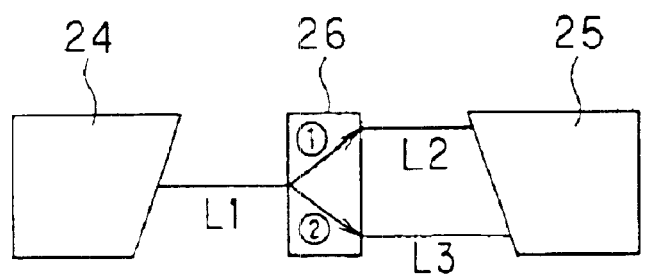
FIGS. 6(a) to (c) schematically illustrate an arrangement of a simple in-line switch.
Figure 6B:
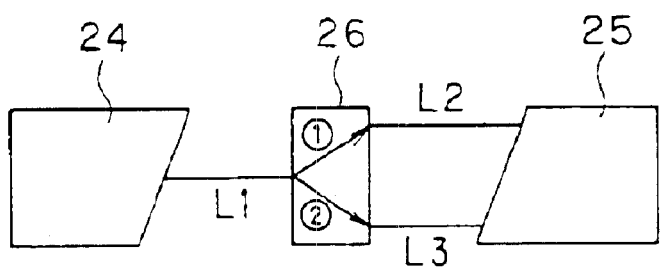
Figure 6C:
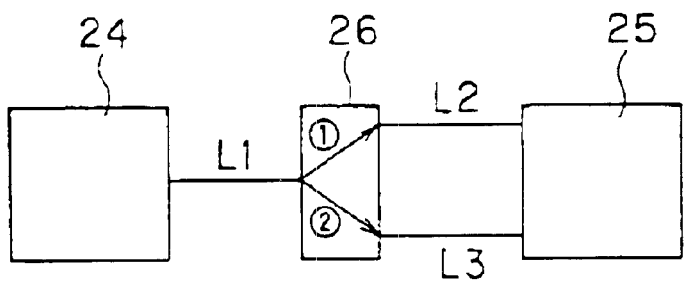

In FIG. 6, there is schematically shown an arrangement of a simple in-line switch. Here, since the switching element depends on the arrangement and method adopted, the optical path length in the element is not taken into consideration. In the arrangement shown in FIG. 6, an optical path length from an input-side fiber array 24 to an in-line optical switch 26 is denoted by L1, and optical path lengths from the in-line optical switch 26 to an output-side fiber array 25 are denoted by L2 and L3. Then, a total optical path length is L1+L2 in the case of switching (1), or L1+L3 in the case of switching (2). In the arrangement shown in FIGS. 6(a) and 6(b), the lengths L2 and L3 are not the same, and therefore, the total optical path length varies depending on switching ((1) or (2)). On the contrary, in the arrangement shown in FIG. 6(c), the lengths L2 and L3 are the same, and therefore, the total optical path length does not vary depending on switching. Thus, it can be said that this arrangement is more advantageous in an application where an equal optical path length is required.

For example, the MEMS switch has typically a large inter-element pitch of the order of 3 mm to reduce a loss and crosstalk. Assuming that the 2DFA has 10 columns and 10 rows and the slant angle of the end face of the optical fiber is 8 degrees, a pitch from a first layer to a tenth layer is 27 (3×9) mm, and thus, the optical path length (path length) difference |L−1| is 3.8 (27×tan 8) mm, which cannot be neglected. Since the optical path length (path length) difference depends on the slant angle of the optical fiber end face, the optical fiber pitch or the like, it cannot be uniquely determined. However, it can be said that the embodiment of the present invention is preferred in the case where the optical path length (path length) difference |L−1| is equal to or more than 1 mm.

In the description of this embodiment, the optical fiber or lens has been used as the optical element. Besides, the optical element may be a waveguide (PLC) array, semiconductor laser (LD) array, or photo diode (PD) array.

In the embodiments described above, the optical fiber array units each comprising a set of optical fiber and substrate are stacked.

The end face from which light is outgoing or incoming of the optical fiber of an individual set of optical fiber array units is slanted by the predetermined angle (θ) with respect to the central axis of the optical fiber, and such optical fiber array units are stacked. In general, optical elements need to be subjected to an optical polishing to meet requirements of optical loss and reflection characteristics, and the end faces thereof are typically polished with a lap polisher. However, the integrated 2DFAs need special grinding with a grindstone. In this case, a high quality is difficult to attain, and the cost is increased. In the embodiments described above, subjecting each of the optical element array units to a normal polishing to readily slant the end face of the optical fiber and then stacking the optical element array units can provide the same effect as the optical polishing. Therefore, the embodiments are preferable in terms of quality and cost.

Figure 7:
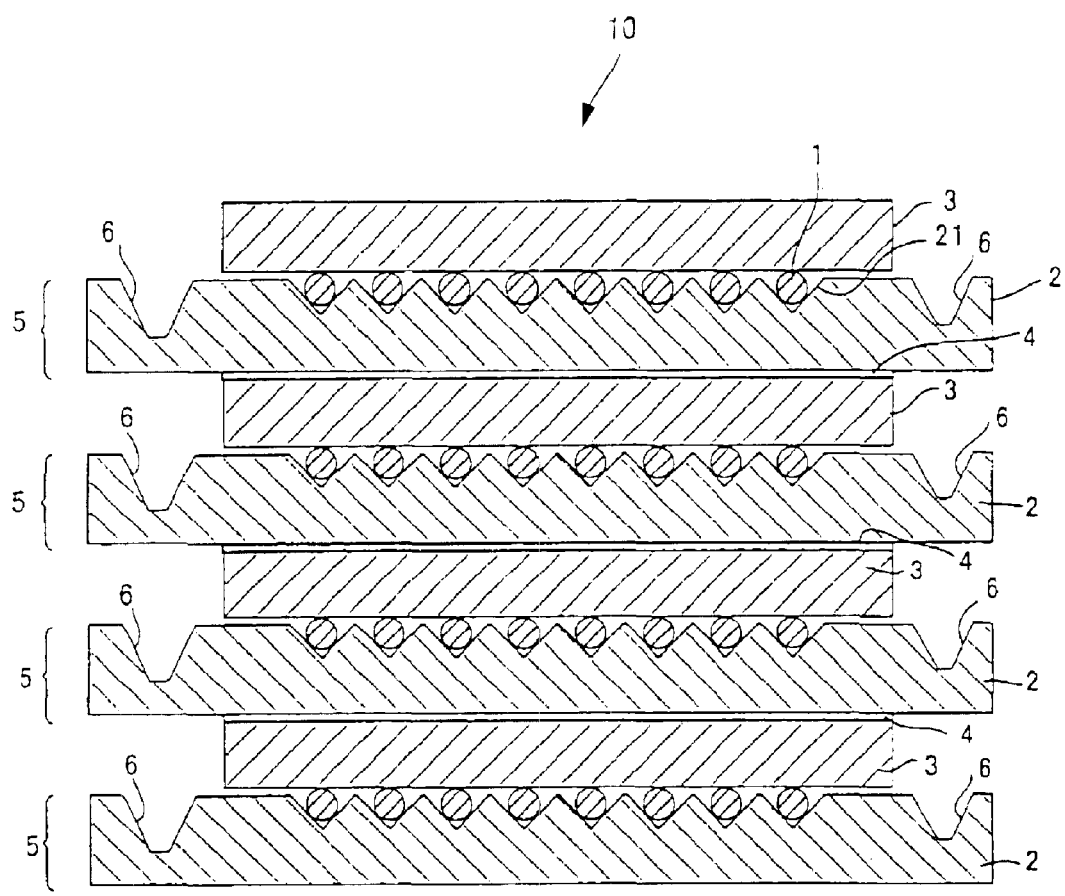
FIG. 7 is a schematic cross-sectional view of a two-dimensional optical fiber array, which is a fourth embodiment of the two-dimensional optical element array according to this invention.

FIG. 7 is a schematic cross-sectional view of a two-dimensional optical fiber array, which is a fourth embodiment of the two-dimensional optical element array according to this invention. As shown in FIG. 7, the two-dimensional optical fiber array 10 in the fourth embodiment further comprises fixing members 3 on one of surfaces of the substrate 2 of the uppermost optical fiber array unit 5 and between the substrates 2 of adjacent optical fiber array units 5, and each fixing member presses or mounts the optical fiber 1 against or on one surface with the grooves 21 of the substrate 2 for fixing and alignment.

In this case, the materials of the substrate and the fixing member are not limited particularly. However, as a preferred example, the materials may be borosilicate glass, which is transparent.

Such an arrangement can provide the state where the surfaces that face each other of the substrates of two adjacent optical fiber array units do not directly contact each other and the adjacent two units do not have a direct mechanical influence on each other. Thus, the stacking precision does not depend on the thickness precision of the substrate, and the need to control the thickness precision of the substrate, which is extremely difficult, is eliminated. Therefore, the alignment precision of the optical fibers on the substrate can be readily increased without intricacy.

In the fourth embodiment shown in FIG. 7, the optical fiber 1 is pressed against or mounted on the substrate 2 for alignment and fixing in a state where the optical fiber 1 is in contact with the surface of the fixing member 3 and side walls of the groove 21.

In addition, an adhesive layer 4 is provided between the surface of the fixing member 3 and the surface other than that with the grooves (back surface) of the substrate 2 of the optical fiber array unit 5 which faces to that surface of the fixing member 3.

The adhesive layer 4 used in this embodiment is not limited to a particular one. However, in the case where the substrate 2 and the fixing member 3 are made of transparent borosilicate glass or the like, it may preferably be an ultraviolet curing adhesive, for example.

While the thickness of the adhesive layer 4 depends on the type of the adhesive used, it preferably falls within a range from 2 to 100 $\mu$m, and more preferably within a range from 3 to 20 $\mu$m. If it is below 2 $\mu$m, an insufficient adhesivity may be resulted, or the optical fiber array units may be partly brought into contact with each other if the substrate precision is low, thereby degrading the precision. If it is beyond 100 $\mu$m, an influence of thermal expansion or curing shrinkage may become negligible.

With such an arrangement, since the adhesive layer having an appropriate thickness lies between the fiber arrays (FAs), the adhesivity of the adhesive can be elicited adequately, and thus, a good long-term reliability can be assured.

Besides, in the fourth embodiment shown in FIG. 7, a positioning guide 6 is formed at a predetermined position in the surface with the grooves 21 of the substrate 2. With such an arrangement, the alignment precision of the optical fibers can be enhanced.

The groove provided in the two-dimensional optical fiber arrays in the first to fourth embodiments described above can have any configuration so far as it is suited to the profile of the optical fiber 1 and can align the optical fibers 1 smoothly and fix them with reliability. However, it is preferably a V-shaped groove capable of supporting the optical fiber 1 at three points.

In the manufacture of the two-dimensional optical fiber array described above, an optical fiber array unit is preferably fabricated first, which is a set of a substrate and one or more optical fibers aligned and fixed in the grooves thereof. This is a usual process of aligning and fixing the optical fibers on one surface of the substrate, and thus the risk of cutting the optical fiber, for example, is low. Also when stacking, the optical fibers are stacked in the form of the optical fiber array unit, and therefore the risk of cutting the optical fiber is low. Furthermore, the stacking is carried out independently, so that the positioning is relatively readily carried out. Furthermore, as described above, the end of the optical fiber can be readily slanted, and the requirement for the optical polishing can be met at the same time. Currently, some two-dimensional optical fiber arrays (2DFA) are needed to have about 1000 cores (for example 32×32). As the number of the cores is increased, the advantage of being capable of assembly without cutting becomes more remarkable.

Now, referring to FIG. 1, a method of manufacturing a two-dimensional optical fiber array, which is one embodiment of a method of manufacturing an optical element array according to this invention, will be described.

The method of manufacturing a two-dimensional optical fiber array according to this embodiment comprises a step of aligning and fixing one or more optical fibers 1 on a substrate 2 having, on one surface thereof, one or more grooves 21 each suited to a profile of the optical fiber 1, and a step of integrating or stacking a plurality of sets of the substrate 2 and the one or more optical fibers 1 to provide a two-dimensional configuration, and is characterized in that an end face S from which light is outgoing and/or an end face from which light is incoming of each optical fiber 1 is slanted by a predetermined angle (θ) with respect to a plane perpendicular to a central axis L of the optical fiber 1.

With such an arrangement, it is possible to manufacture, efficiently and at low cost, the two-dimensional optical element array which has superior reflection characteristics of the end face, from which light is outgoing or incoming, of the optical element on the substrate, and can maintain the superior reflection characteristics for a long period and prevent a loss of quantity of light and an adverse effect to another device.

For example, the end face S from which light is outgoing of the optical fiber may be slanted as follows: optical fibers are incorporated with each optical fiber array unit and fixed thereto with an adhesive; the end faces S are polished with a lap polisher or the like, as in the case of a typical one-dimensional optical fiber array, in such a manner that the end faces S are inclined by a desired angle with respect to the surface plate of the lap polisher; and thus, the end faces S can have a slant of the desired angle.

Preferably, in this case, the optical fiber array unit comprising a set of optical fibers and the substrate is first fabricated, and then a plurality of optical fiber array units thus fabricated are stacked.

Figure 8A:
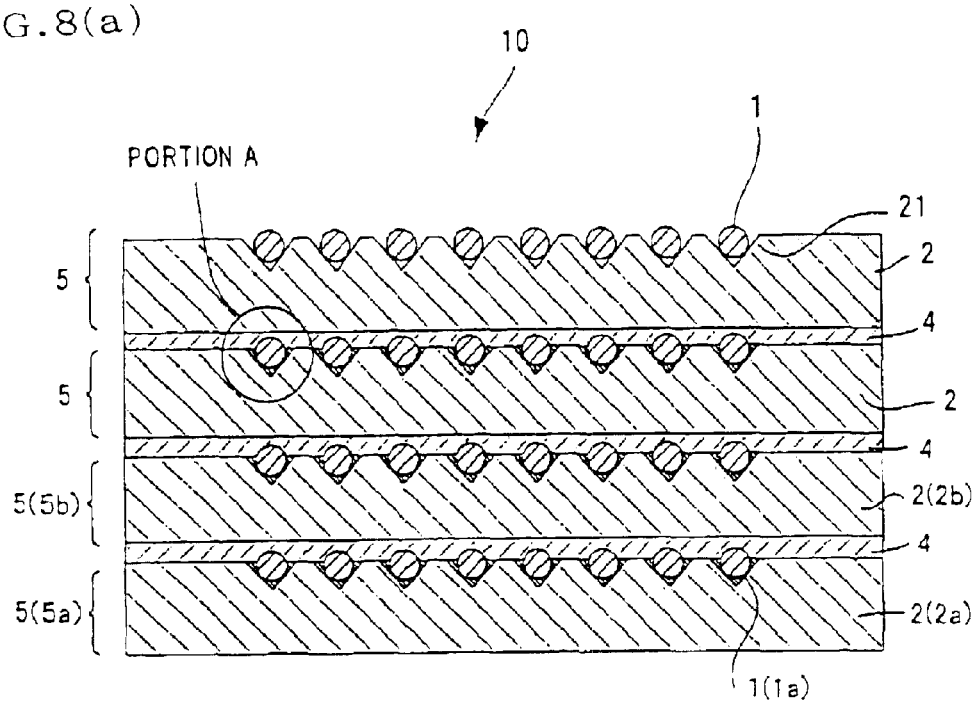
FIG. 8(a) is a schematic cross-sectional view of a two-dimensional optical fiber array, which is a fifth embodiment of the two-dimensional optical element array according to this invention.
Figure 8B:
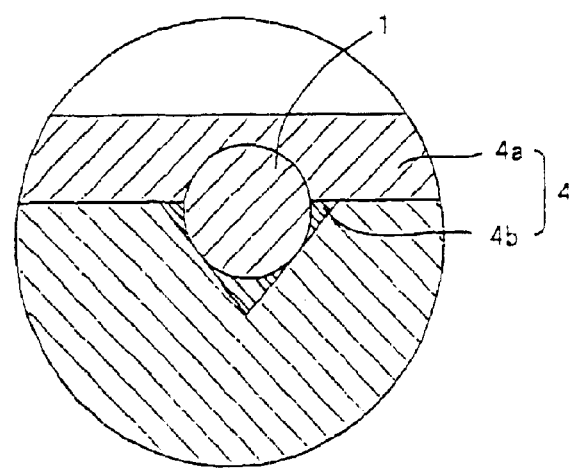
FIG. 8(b) is a partial enlarged schematic view of the portion A.

According to a method of manufacturing the two-dimensional optical fiber array 10 with no fixing member 3 (see FIG. 1) as shown in FIG. 8(a), for example, a plurality of optical fiber array units 5 may be stacked in such a manner that an adhesive layer 4 (4a, 4b) is interposed between the apexes of the optical fibers 1 arranged on the substrate 2 of one optical fiber array unit 5 (5a, 5b), as is shown in FIG. 8(b), and a surface of the substrate 2 (2a, 2b) of the optical fiber array unit 5 opposing thereto, and the apexes of the optical fibers 1 and the surface of the substrate 2 (2a, 2b) are brought into contact with the adhesive layer 4 (4a, 4b), thereby the surfaces facing each other of the substrates 2 (2a, 2b) of adjacent optical fiber array units 5 (5a, 5b) do not directly contact each other, and the adjacent two units do not have a direct mechanical influence on each other. Here, the adhesive layer 4a connects and fixes the optical fiber array units 5 with each other, and the adhesive layer 4b connects and fixes the substrate 2 and the optical fiber 1 with each other. The adhesive layer 4 may be omitted, as far as there can be realized the state where the facing surfaces of adjacent substrates 2 (2a, 2b) do not directly contact each other, and that the two adjacent units do not have a direct mechanical influence on each other.

When manufacturing the optical fiber array 10 with no fixing member 3 (see FIG. 1) as shown in FIG. 8(a), specifically, a plurality of optical fiber array units may be stacked in such a manner that the apexes of the optical fibers arranged on the substrate of one optical fiber array unit is brought into contact with a surface of the substrate of the optical fiber array unit opposing thereto, thereby the surfaces of the substrates of two adjacent optical fiber array units that face each other do not directly contact each other, and the two adjacent units do not have a direct mechanical influence. Alternatively, a plurality of optical fiber array units may be stacked in such a manner that an adhesive layer is interposed between the apexes of the optical fibers arranged on the substrate of one optical fiber array unit and a surface of the substrate of the optical fiber array unit opposing thereto, and the apexes of the optical fibers and the surface of the substrate are brought into contact with the adhesive layer, thereby the facing surfaces of the substrates of adjacent optical fiber array units do not directly contact each other, and the two adjacent units do not have a direct mechanical influence on each other.

In this case, a temporary fixing member (not shown) can be used to make the optical fiber abut against the V-shaped groove in the step of fabricating each optical fiber array unit, and after the assembly of the optical fiber array unit, the fixing member can be removed to stack the optical fiber array units. In this case, removal of the fixing member can be facilitated if the fixing member is made of fluororesin, such as tetrafluoroethylene, or a mold release agent is applied on the substrate.

With such an arrangement with no fixing member, the total thickness of the optical fiber array can be readily reduced. In general, the pitch in the thickness direction (stacking direction) depends on the thickness of each optical fiber array unit and cannot be less than that. To make the pitch narrower, each fiber array unit has to be made thinner. However, there is a limit in terms of strength. In the case where each optical fiber array unit comprises the substrate and the fixing member, a limit thickness thereof is a sum of a limit thickness of the substrate and a limit thickness of the fixing member. If the fixing member is omitted, however, the limit thickness of each optical fiber array unit is equal to the limit thickness of the substrate, and accordingly, the pitch in the thickness direction (stacking direction) can be reduced. Specifically, the limit thickness of the substrate is on the order of 0.5 mm, and the limit thickness of the fixing member is on the order of 0.4 mm. Thus, the limit thickness of the optical fiber array unit, which would be about 0.9 mm if it comprises the substrate and the fixing member, can be reduced to about 0.5 mm by omitting the fixing member.

Another advantage of the fact that the fixing member is omitted (each optical fiber array unit comprises the substrate and the optical fibers) is that an adverse effect due to a high coefficient of thermal expansion (α) of the adhesive layer can be avoided. If the fixing member is used, it is also needed to bond the substrate and the fixing member with the adhesive layer. Experimentally, the adhesive layer preferably has a thickness of the order of 30 μm, and the adhesive layer between the optical fiber array units has a thickness of the order of 10 μm. The total thickness of the adhesive layer for one layer is on the order of 40 μm, and thus, the effect of the coefficient of thermal expansion (α) of the adhesive layer cannot be neglected. Specifically, if the coefficient of thermal expansion (α) of the adhesive layer used in the present invention is on the order of $10 \times 10^{-6}$, borosilicate glass (manufactured by Corning Incorporated, trade name: Pyrex) is used for the substrate, and the pitch is 1.5 mm (a case of Example 1 described later), the whole two-dimensional optical fiber array including the adhesive layers between the substrates and the fixing members has different coefficients of thermal expansion (α) in the width direction and in the thickness direction, specifically, $33 \times 10^{-7}$ in the width direction and $58 \times 10^{-7}$ in the thickness direction. Since the MEMS optical switch or the like is formed on a surface of silicon (Si) or the like, it essentially should not have a direction dependency of thermal expansion, and thus, the above-described direction dependency of thermal expansion may become a problem.

To solve this problem, the adhesive layer can be reduced in thickness. If the fixing member is omitted, the thickness of the adhesive layer can be reduced without any other special measures. The thickness of the adhesive layer between the optical fiber array units is about 10 µm. One reason for this is that, according to a common manufacturing method, the substrate and the fixing member each have a variation in thickness on the order of ±3 µm, and therefore, a variation in thickness thereof on the order of ±6 µm needs to be taken into account for each optical fiber array unit. In other words, the thickness of the adhesive layer between the optical fiber array units on the order of 10 µm implies that the thickness of the adhesive layer approximately falls within a range of 10±6 µm, and is, at the minimum, about 4 µm. If the fixing member is omitted, only the variation in thickness of the substrate on the order of 3 µm needs to be taken into account. Thus, in order to assure the minimum thickness of 4 µm, it is sufficient that the thickness of the adhesive layer approximately falls within a range of 7 ±3 µm, and in other words, the adhesive layer has a thickness on the order of 7 µm. That is, the thickness of the adhesive layer per layer in this case is on the order of 7 µm. In this case, the coefficient of thermal expansion ($\alpha$) in the thickness direction is $37 \times 10^{-7}$, and the direction dependency of thermal expansion can be neglected.

A two-dimensional optical fiber array formation (2DFA formation) after the two-dimensional optical fiber array unit is fabricated in the method of manufacturing a two-dimensional optical fiber array of this invention will be described in more detail below.

A first method of two-dimensional optical fiber array formation may be to stack and fix the optical fiber array units while actively adjusting them. For example, the optical fiber array units may be stacked and fixed with an adhesive or the like while launching white light into the end faces from which light is outgoing or incoming of the two-dimensional optical fiber array units at the side opposite to the end faces from which light is outgoing or incoming thereof, observing outgoing light from the optical fibers with a CCD camera to know the positions of the optical fibers, and adjusting relative positions between the optical fiber array units. If a plurality of optical fiber array units are stacked and fixed simultaneously, a large-scale apparatus needs to be used therefor. Therefore, the stacking and fixing thereof are preferably carried out one after another.

A device for securely holding the optical fiber array unit is preferably used to prevent a displacement from the determined position thereof due to curing shrinkage when the adhesive is cured.

Figure 9:
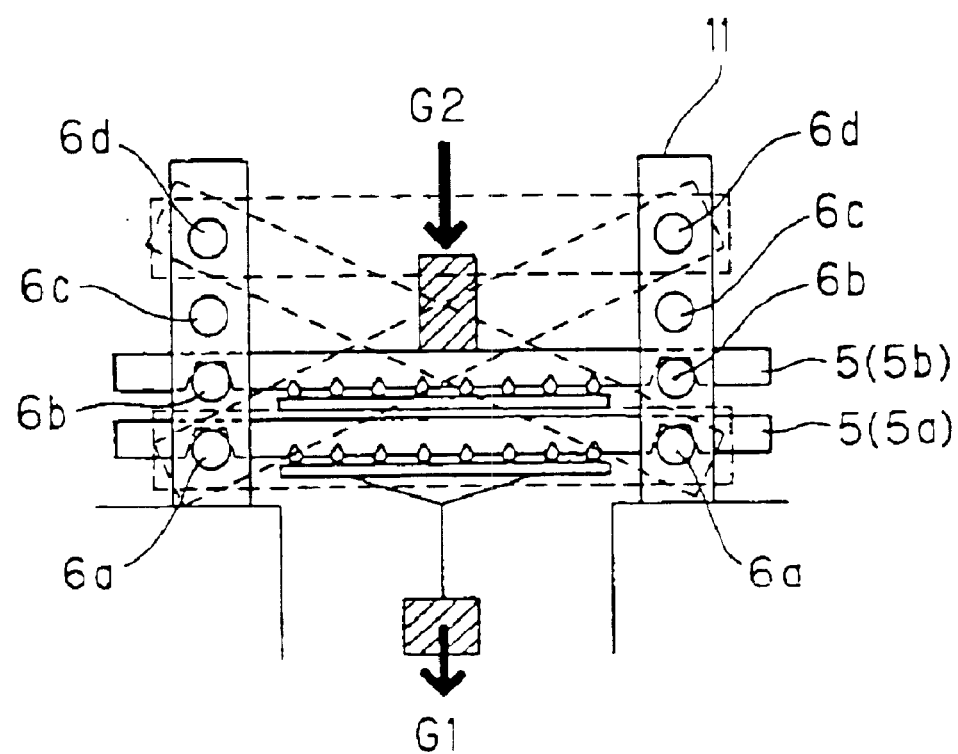
FIG. 9 is a cross-sectional view for schematically illustrating a guide pin jig used for provide a two-dimensional configuration of the two-dimensional optical fiber array, which is an embodiment of the two-dimensional optical element array of this invention.

For example, a method involving a guide pin jig, as shown in FIG. 9, is suitable. As shown in FIG. 9, first, the lowermost optical fiber array unit 5a is disposed between first guide pins 6a and second guide pins 6b, one each of which is provided on each of two vertical beam jigs of a guide pin jig 11. Then, in order to assure contact between the guide pins and guide grooves of the V-shaped grooved substrate of the FA, a load G1 is given to the lowest optical fiber array unit 5a by pulling the same downwardly. Next, the second lowest optical fiber array unit 5b is disposed between the second guide pins 6b and third guide pins 6c, and in order to assure contact between the guide pins and the guide grooves of the V-shaped grooved substrate of the FA, a load G2 is given to the optical fiber array unit 5b by pressing the same from above. In this state, an ultraviolet curing adhesive is spread between the optical fiber array units 5a and 5b, and irradiated with ultraviolet rays for curing. Here, since any adhesive flowing into the guide groove causes the guide pin to be fixed thereto, the adhesive is carefully made to flow only between the V-shaped grooved substrate of the optical fiber array unit 5a and the upper lid substrate of the optical fiber array unit 5b. For third lowest and upper optical fiber array units 5, as in the case of the optical fiber array units 5b, the optical fiber array unit 5 is disposed between the guide pins, the load G2 is given thereto from above, and the optical fiber array unit is fixed with the adhesive. The same process is conducted up to the eighth layer to provide a stack.

Assuming that an optical axis is the z-axis, an axis extending in the stacking direction is the y-axis, and an axis perpendicular to the z-axis and the y-axis and extending in the direction of arranging the optical fibers on one substrate is the x-axis, alignment of the optical fiber array units in the directions of the x- and y- axes is preferably conducted while observing beam centers through image recognition, and an optical axis parallelism $\theta y$ for each layer is preferably adjusted by observing a distance in the direction of the z-axis through an auto-focus function or a scheme for searching a beam waist. Besides, an optical axis parallelism $\theta x$ is preferably adjusted so that the bottom surfaces of the substrates with V-shaped grooves of the optical fiber array units stacked one on another are parallel to each other and spaced apart from each other by a desired distance by observing the optical fiber array units from a side. Since the bottom surface of the substrate with V-shaped grooves and the line formed by the V-shaped grooves are parallel to each other, both the $\theta x$ and the $\theta z$ can be adjusted according to this method. With this method, although a device used becomes complicated, the two-dimensional optical fiber array formation (2DFA formation) can be conducted with reliability.

A second two-dimensional optical fiber array formation may be to position the optical fiber units by using a guide groove (positioning guide) 6 provided on the optical fiber array unit 5 and a positioning guide pin adapted to the guide, as shown in FIG. 7. In this case, a large-scale positioning device is not needed, and only a high-precision guide pin jig is needed. Since both the V-shaped grooves 21 for the fibers and the V-shaped guide grooves 6 can be provided on one and the same surface of the substrate 2 with V-shaped grooves, quite high precision of the V-shaped grooves 21 for the fibers and the V-shaped guide grooves 6 can be assured in terms of the positions, as well as the parallelism thereof. That is, according to this method, the positions in x and y directions and the optical axis parallelisms $\theta x$, $\theta y$, and $\theta z$ can be adjusted simultaneously, and quite high workability is provided. Here, the guide groove used for positioning may be used as a reference for polishing after stacking, or used for coupling the two-dimensional optical fiber array (2DFA) with another optical device. For example, when a user of another existing optical device is to couple a 2DFA with the existing optical device, he/she can use the guide groove of the 2DFA as a reference parallel to the optical axis. The guide groove can be omitted for downsizing, if it is not necessary.

Figure 10A:
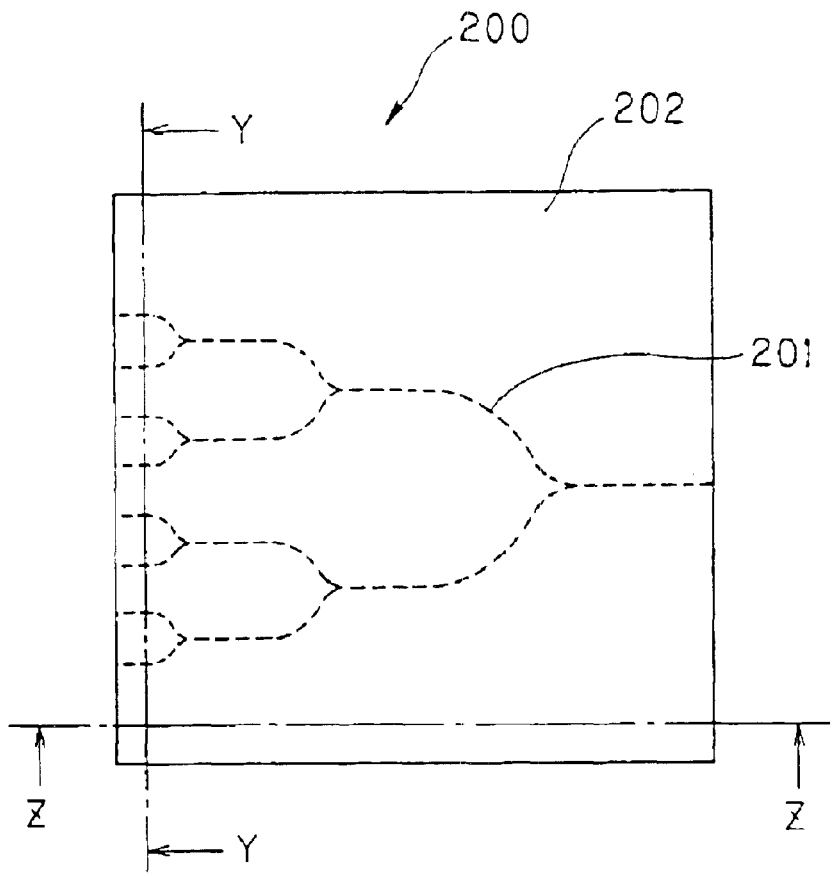
Figure 10B:
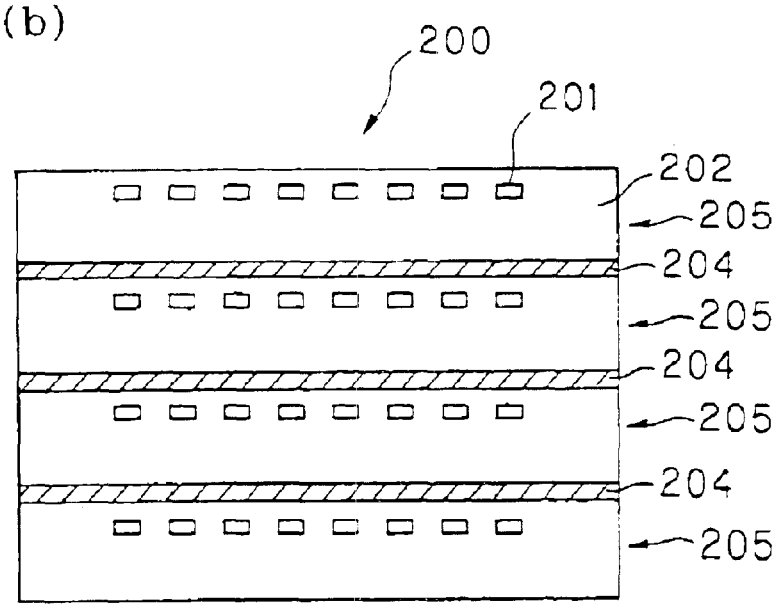
Figure 11A:
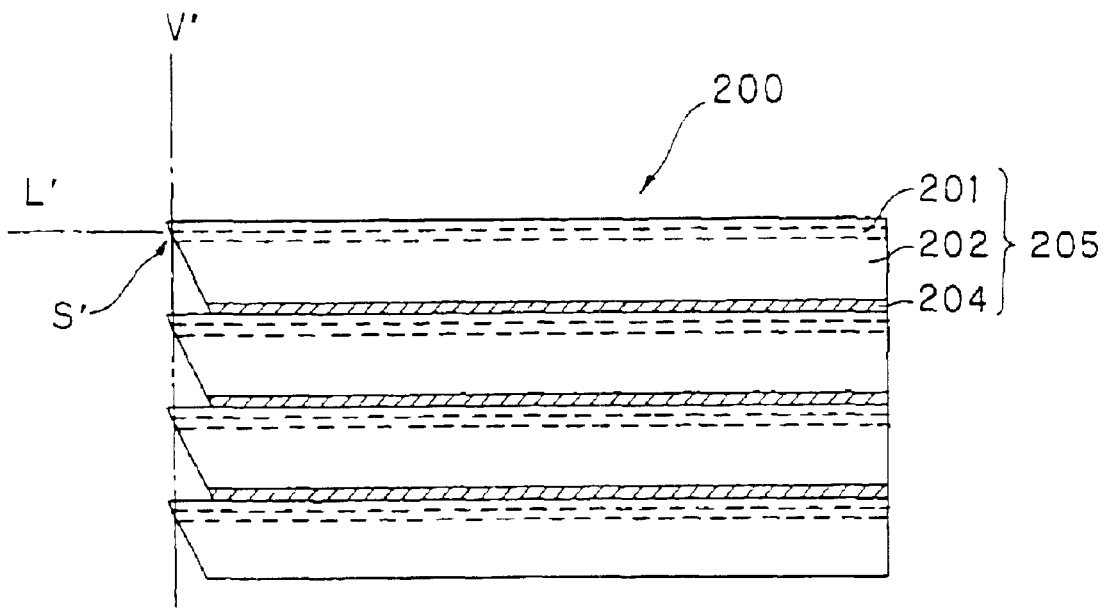
FIGS. 11(a) and 11(b) are cross-sectional views taken along a line Z—Z in FIG. 10(a) and showing two aspects of this invention.
Figure 11B:
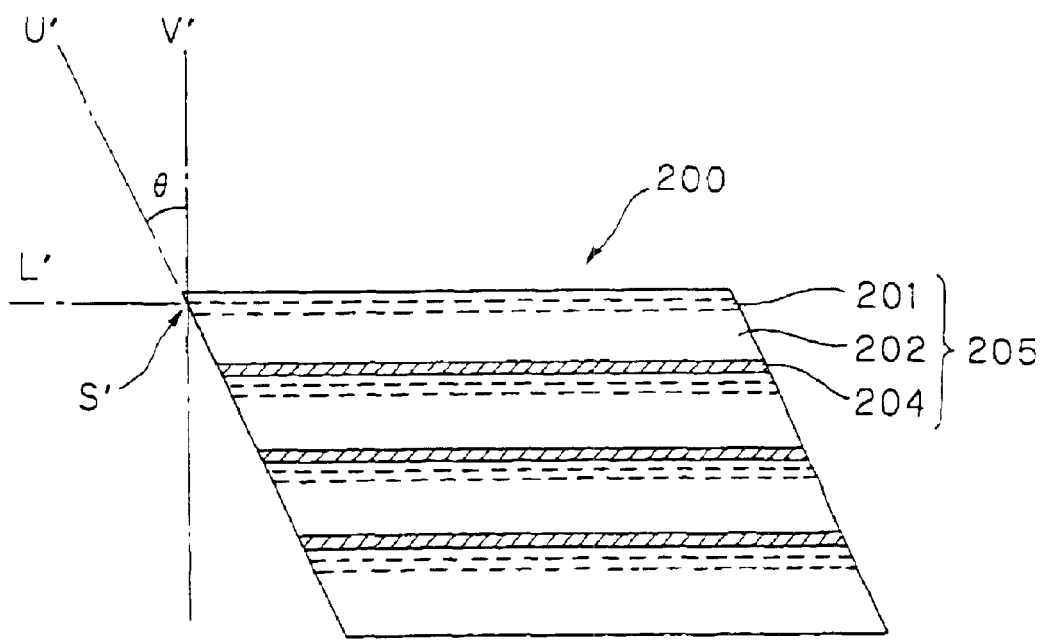

FIGS. 10 and 11 schematically show one embodiment of a two-dimensional waveguide apparatus of this invention, in which FIG. 10(a) is a plan view, FIG. 10(b) is a cross-sectional view taken along a line Y—Y in FIG. 10(a), FIG. 11(a) is a cross-sectional view taken along a line Z—Z in FIG. 10(a) illustrating one aspect of this invention, and FIG. 11(b) is a cross-sectional view taken along the line Z—Z in FIG. 10(a) illustrating another aspect of this invention. As shown in FIGS. 10 and 11, a two-dimensional waveguide apparatus 200 of this invention comprises a two-dimensional integral body or two-dimensional stack of a plurality of waveguide substrate units 205 each having one or more waveguides 201 patterned in a planar manner, in which an end face S' from which light is outgoing and/or an end face from which light is incoming of the waveguide 201 of the waveguide substrate unit 205 is slanted by a predetermined angle (θ) with respect to a plane V' perpendicular to a central axis L' of the waveguide.

With such an arrangement, the density and capacity thereof can be enhanced and the number of steps in packaging or connection can be reduced.

In this case, as shown in FIG. 11(a), the end faces S' from which light is outgoing and/or end faces from which light is incoming of the waveguides 201 of the waveguide substrate units 205 may be disposed in the plane V' perpendicular to the central axes L' of the waveguides. Alternatively, as shown in FIG. 11(b), the end faces S' from which light is outgoing and/or end faces from which light is incoming of the waveguides 201 of the waveguide substrate units 205 may be disposed in a plane U' angled at a predetermined angle (θ) with respect to the plane V' perpendicular to the central axes L' of the waveguides. Furthermore, as in the case of the two-dimensional optical fiber array shown in FIG. 5, the end faces S' from which light is outgoing and/or end faces from which light is incoming of the waveguides of the waveguide substrate units may be disposed in a plane perpendicular to the optical axis of the outgoing light and/or incoming light.

To prevent light from being reflected back to (launched again into) the end face S' of the waveguide 201 of the two-dimensional waveguide apparatus of this invention, as in the case of the 2DFA described above, if a common quartz waveguide is used, it is only needed to provide the slant angle of the end face equal to or more than 8 degrees. Besides, to provide the angle deviation (Δθ) equal to or less than 15 degrees, if the common quartz waveguide is used, it is only needed to provide the slant angle θ of the end face S' from which light is outgoing of the waveguide equal to or less than 28 degrees in the case shown in FIG. 11(a) and equal to or less an 15 degrees in the case shown in FIG. 11(b). Furthermore, to provide the angle deviation (Δθ) equal to or less than 10 degrees, it is only needed to provide the slant angle θ equal to or less than 20 degrees in the case shown in FIG. 11(a).

In addition, as shown in FIGS. 11(a) and 11(b), an adhesive layer 204 may be provided between the surfaces facing each other of two adjacent waveguide substrate units 205 of the plurality of waveguide substrate units 205. As the adhesive layer 204, the same as in the above-described two-dimensional optical fiber array can be used.

The thickness of the adhesive layer 204 preferably falls within a range from 2 to 100 μm for the same reason as in the above-described two-dimensional optical fiber array.

Furthermore, as shown in FIG. 11, one of the embodiments of this invention is directed to a method of manufacturing a two-dimensional waveguide apparatus, which comprises a step of integrating or stacking a plurality of waveguide substrate units 205 each having one or more waveguides 201 patterned in a planar manner to provide a two-dimensional configuration, in which an end face S' from which light is outgoing and/or an end face from which light is incoming of the waveguide 201 is slanted by a predetermined angle (θ) with respect to a plane V' perpendicular to a central axis L' of the waveguide.

In this case, the end faces S' from which light is outgoing and/or end faces from which light is incoming of the waveguides 201 of the waveguide substrate units 205 may be disposed in the plane V' perpendicular to the central axes L' of the waveguides, or the end faces S' from which light is outgoing and/or end faces from which light is incoming of the waveguides 201 of the waveguide substrate units 205 may be disposed in a plane U' angled at a predetermined angle (θ) with respect to the plane perpendicular to the central axes L' of the waveguides. Alternatively, as in the case of the two-dimensional optical fiber array shown in FIG. 5, the end faces S' from which light is outgoing and/or end faces from which light is incoming of the waveguides of the waveguide substrate units may be disposed in a plane perpendicular to the optical axis of the outgoing light and/or incoming light.

An adhesive layer 204 may be provided between the surfaces facing each other of two adjacent waveguide substrate units 205 of the plurality of waveguide substrate units 205. In this case, the thickness of the adhesive layer 204 preferably falls within a range from 2 to 100 μm.

As a method of stacking the waveguide substrate units 205 to form a two-dimensional waveguide apparatus, the same method as in the above-described two-dimensional optical fiber array can be used. In this case, for example, a positioning guide formed at a predetermined location on a surface of the waveguide substrate unit may be involved.

Figure 12:
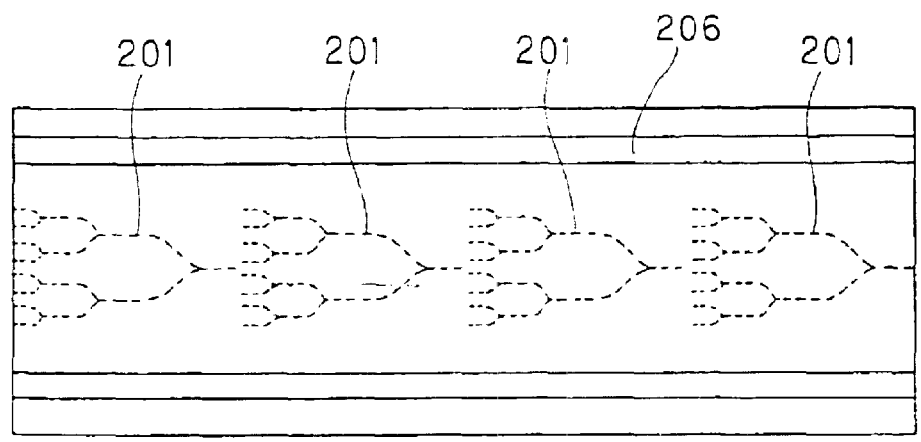
FIG. 12 is a schematic plan view for illustrating a method of stacking waveguide substrate units to provide a two-dimensional configuration in one embodiment of the two-dimensional waveguide apparatus of this invention.

FIG. 12 shows a case where four chips of waveguides 201 are formed on a single wafer with center lines thereof aligned, and positioning guides 206 are formed on both sides of the waveguides 201. These waveguides 201 can be formed by photolithography, for example. From the single wafer thus processed, the waveguide substrates to be stacked are cut and reserved. Thus, even if positions of the positioning guides 206 in transverse and depth directions with respect to the waveguides 201 are not absolutely precise, precision of stacking can be assured because the waveguide substrates to be stacked have the positioning guides aligned with each other.

Figure 13A:
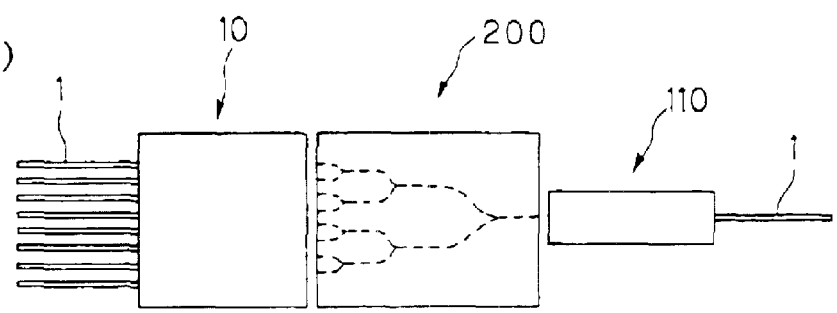
FIGS. 13(a) and 13(b) are plan view and side view, respectively, schematically showing a state where the two-dimensional optical fiber array and a one-dimensional optical fiber array are connected to each other via the two-dimensional waveguide apparatus.
Figure 13B:
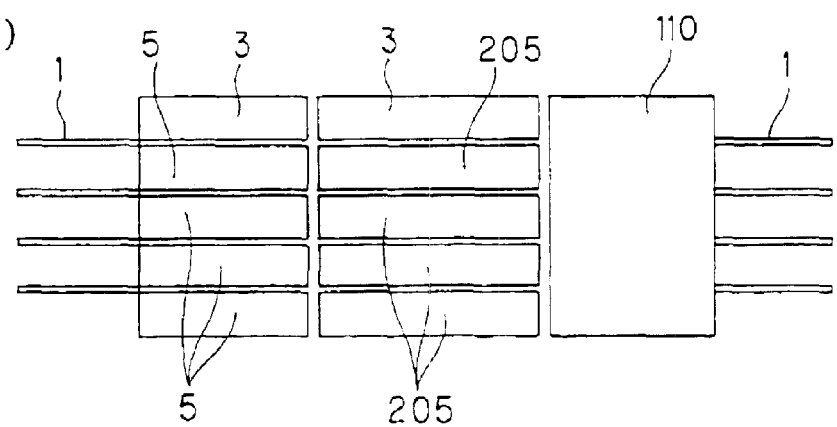
Figure 14:
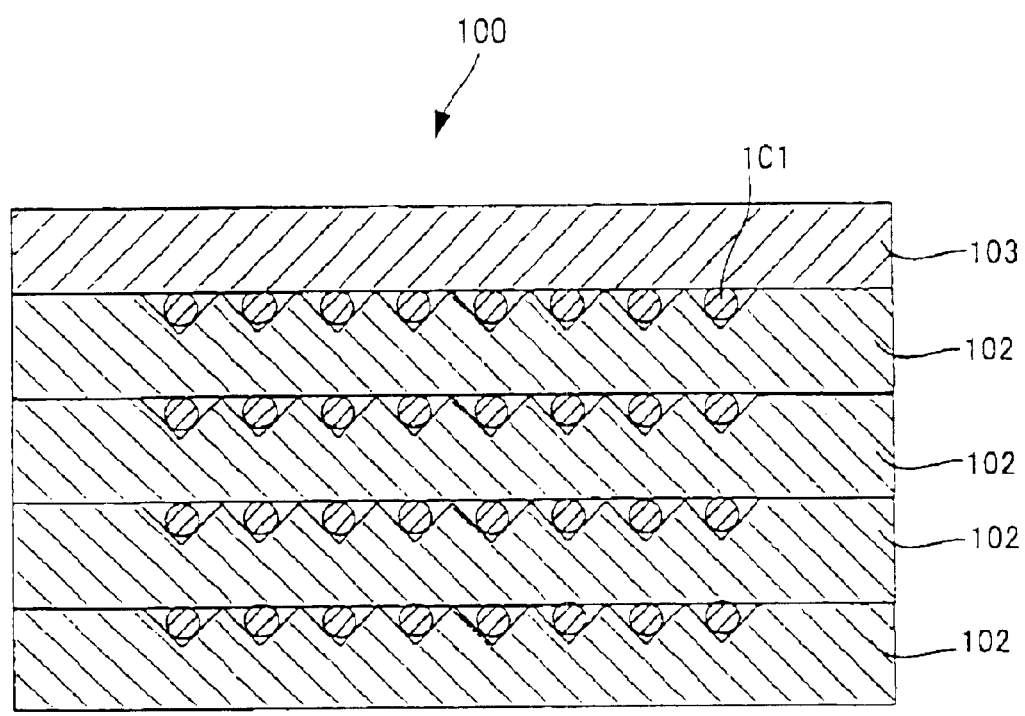
FIG. 14 is a schematic cross-sectional view of an exemplary conventional two-dimensional optical element array (optical fiber array)
Figure 15A:
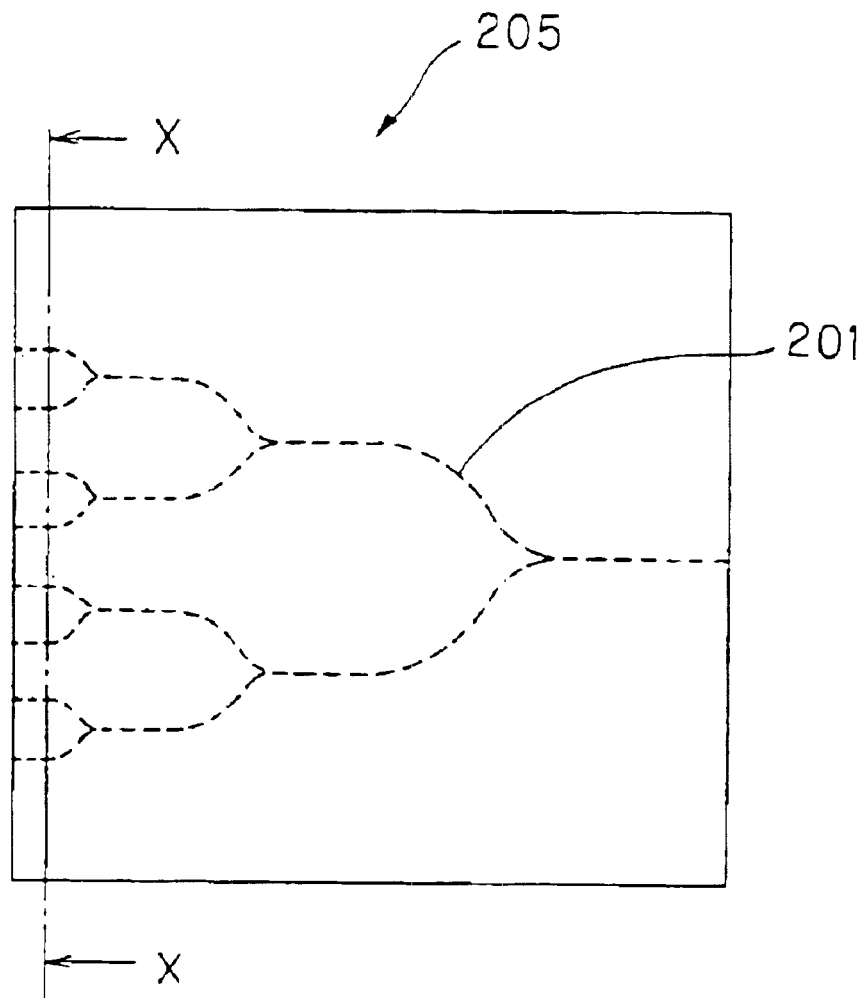
Figure 15B:
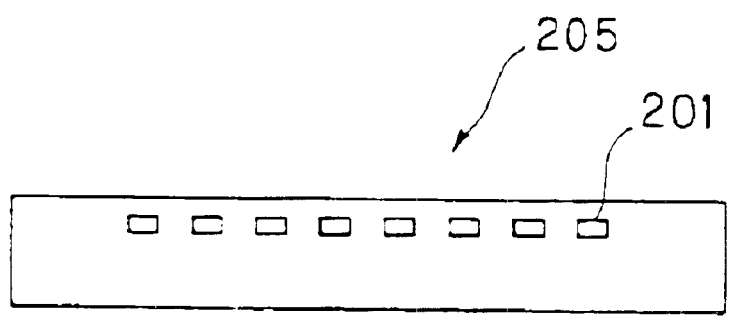

FIG. 13 schematically illustrates a state where a two-dimensional optical fiber array 10 and a one-dimensional optical fiber array 110 connected to each other via a two-dimensional waveguide apparatus 200, in which FIG. 13(a) is a plan view, and FIG. 13(b) is a side view. In FIG. 13, one-dimensional optical fiber array 110 with four channels, turned 90 degrees, is connected to a two-dimensional optical fiber array 10 with eight channels via the two-dimensional waveguide apparatus 200. The two-dimensional waveguide apparatus 200 comprises four waveguide substrate units 201 and a fixing member 3 stacked one on another, and the two-dimensional optical fiber array 10 comprises four optical fiber array units 5 and a fixing member 3 stacked one on another.

As described above, when connecting the waveguide substrates and the optical fiber arrays with each other, each of the optical fibers needs to be optically aligned with one of the waveguide substrates. In this alignment, the waveguide substrate and the optical fiber array are aligned with each other on the level of submicrons, and thus, there has been a problem in that the alignment inevitably requires extremely high precision and many process steps. However, with such an arrangement, one alignment process allows four substrates to be aligned, and thus, the number of steps in alignment and connection can be reduced substantially.

This invention will be described in more detail below with reference to an example. However, this invention should not be limited by the example in any sense.

EXAMPLE 1

The two-dimensional optical fiber array having a low return loss and 8- by 10-channels with a pitch of 1.5 mm and comprising a stack of optical fiber array units including optical fibers whose end faces from which light is outgoing or incoming are polished to be slanted by a predetermined angle ($\theta=8°$) with respect to the plane perpendicular to the optical axes thereof was fabricated. In this example, fabrication of the optical fiber array units, stacking of the optical fiber array units, and evaluation of the fabricated two-dimensional optical fiber array were conducted in this order.

Fabrication of Optical Fiber Array Unit

A substrate of borosilicate glass (coefficient of thermal expansion: $32\times10^{-7}$) was machined to provide a wafer of a size of 50 mm×55 mm×1.495 mm (thickness). The wafer was ground to form the V-shaped grooves for aligning and fixing the optical fibers and the positioning guides (V-shaped guide grooves) thereon. Eight V-shaped grooves were formed with a pitch of 1.5 mm, and the positioning guides (V-shaped guide grooves) were formed by being shifted 2 mm outward from the first and eighth V-shaped grooves.

Then, the wafer was cut into substrate chips of a predetermined size, each used for the optical fiber array unit. Since the two-dimensional optical fiber array to be provided has 8- by 10-channels, 10 substrate chips (optical fiber array units) were fabricated.

Then, the optical fiber array units were assembled. In this assembly, the optical fibers were first placed in the V-shaped grooves on the substrate, the optical fibers were pressed against the V-shaped grooves with a temporary fixing member (the temporary fixing member itself is not bonded, since it is made of an SUS material 1 mm thick and coated with fluororesin, such as polytetrafluoroethylene), and an adhesive for fixing (epoxy resin) was spread thereon and irradiated with ultraviolet rays for fixing. After the adhesive for fixing was cured, the temporary fixing member was peeled off the substrate to provide the optical fiber array unit.

Then, to prevent a coated part of an optical fiber from being made free to cause cutting of the optical fiber, an adhesive for fixing the coating (urethane acrylate resin) was applied to the rear end of the optical fiber array unit to fix the coated parts of the optical fibers.

Then, the end face of the optical fiber array unit was polished to be slanted. In order to make the end face of the optical fiber array unit be angled by $\theta=8°$, a dedicated jig was prepared. In this case, assuming that the optical axis extends in the direction of an angle $0°$, the slant angle of the end face of the optical fiber array unit is 82°. Using the dedicated angled jig, the end face of the optical fiber array unit was coarse-lapped, fine-lapped, and then polished. This resulted in an error of ±0.3° for the angle of 82°.

Stacking of Optical Fiber Array Units

There are various methods of stacking the optical fiber array units, and a guide pin jig was used in this example. Here, the "guide pin jig" refers to a jig having guide pins mounted thereon with high precision for positioning the optical fiber array units in the stacking direction thereof. The guide pins and the jig substrate were made of zirconia. A beam, on which the guide pins are to be mounted, had V-shaped grooves with a pitch of 1.5 mm. The guide pins (diameter: 0.7 mm) were inserted into the V-shaped grooves and pressed against with a fixing member, thereby setting up the guide pins. In addition, two beams having the guide pins need to be positioned relative to each other with high precision. Thus, in order to positioning the two beams relative to each other with high precision, the relative position of the beams with the pins was precisely defined using a transverse beam and a diagonal beam.

The optical fiber array units were disposed between the guide pins mounted on the guide pin jig sequentially. Here, the guide pins and the positioning guides (V-shaped guide grooves) formed on the optical fiber array unit need to be in close contact with each other. Thus, a load was given to the optical fiber array unit to assure the contact with the guide pins. In this case, the load given to the optical fiber array unit was about 30 g. The optical fiber array units need to be aligned in the direction of the optical axes thereof with high precision. In this example, the optical fiber array unit was abutted against the substrate of the guide pin jig at the end faces thereof, thereby aligning the optical fiber array units. The alignment variation of the end faces of the optical fiber array units was about 10 μm. In this way, one optical fiber array units was fixed to the guide pin jig, and a next optical fiber array unit was fixed to the guide pin jig in the same manner.

Then, the optical fiber array units were fixed to each other by spreading an adhesive (ultraviolet curing epoxy resin) into a space therebetween. The adhesive layer formed between the optical fiber array units was about 10 μm thick. This process was repeated to fabricate the two-dimensional optical fiber array comprising ten layers.

Evaluation of Two-Dimensional Optical Fiber Array

First, evaluation of the precision of the two-dimensional optical fiber array fabricated in this example was conducted. The optical fiber array units were referred to as rows 1 to 10 from the bottom, and the columns of optical fibers were assigned reference characters A to H from left to right. The core positions of the rows 1 to 10 each having eight channels were measured, and the core positions of the columns A and H each having ten channels were measured. In addition, a diagonal distance (1,A)–(10,H) and (1,H)–(10,A) was measured. All the core positions of the two-dimensional optical fiber array were determined based on the relative position of the lowermost optical fiber array unit corresponding to the row 1 and the uppermost optical fiber array unit corresponding to the row 10 thus determined and the core positions for the columns A and H. A deviation of the core position matrix from an ideal core position matrix was calculated.

As a result, it was confirmed that, for all channels, core positions of the two-dimensional optical fiber array fabricated in this example lie within a range of ±2 μm from their respective positions in the ideal core position matrix.

Then, a return loss at the end face of the two-dimensional optical fiber array fabricated in this example was evaluated. The return loss was measured with an optical coherence domain reflectometry (OCDR). Here, the length of the optical fiber from a connector to the array end face of the two-dimensional optical fiber array was about 1.8 m.

As a result, the return loss at the end face of the two-dimensional optical fiber array fabricated in this example was confirmed to be 60 dB or more for all channels.

Then, reliability evaluation of the two-dimensional optical fiber array fabricated in this example was conducted. The two-dimensional optical fiber array was subjected to a thermo cycle test (−40 to 85° C.×70 cycles) and a high temperature and high humid test (85° C./85%×2 weeks).

As a result, it was confirmed that the two-dimensional optical fiber array fabricated in this example had the same core position precision and return loss before and after the tests. Good results were obtained. That is, the variation in core positions thereof was sufficiently low, specifically 0.3 μm or less, and the return loss was not changed.

EXAMPLE 2

The two-dimensional waveguide apparatus comprising a stack of four splitters each having 1- by 8-channels was connected to the two-dimensional optical fiber array. A waveguide core having waveguides with a pitch of 250 μm (on the side of 8 channels) was placed on a Si wafer having a thickness of 1 mm so as to be 1.03 mm high from the bottom of the Si wafer, and a clad having a thickness of 0.025 mm was formed thereon, thereby providing a splitter unit having a total thickness of 1.055 mm. As shown in FIG. 12, four chips of splitters were formed on one wafer, and positioning guides (grooves) were formed by grinding on the wafer with a pitch of 5 mm. In order to assure the stacking precision, the wafer was processed in the following manner so that the center positions, relative depth with respect to the waveguide and pitch of the stacking guide pins placed in the guide grooves are constant. The wafer was applied to a processing jig, as shown in FIG. 3 in JP-A-5-273442, so as to be parallel to a reference surface for an object to be processed (both of a side surface and a bottom surface), and the positioning guides were formed so as to be parallel to a reference surface of a processing machine, thereby realizing the accurate relative position thereof. In this case, the required relationship between the reference surface for an object to be processed and the reference surface of the processing machine, such as parallel or orthogonal relationship, was assured. The wafer was cut into splitter chips, and the splitter chips were stacked and fixed with a core pitch of 1.06 mm in the stacking direction in a stacking manner shown in FIG. 11(b). That is, the adhesive layer between the splitter units was 5 μm. The end faces of the two-dimensional splitters were polished to have a shape angled by 8° as shown in FIG. 11(b). Then, the two-dimensional optical fiber array having 8- by 4-cores configured as shown in FIG. 1 was fabricated in the same manner as in Example 1. The end face was polished to be angled by 8° after stacking. The thickness of the optical fiber array unit (distance from the bottom of the V-shaped grooved substrate to the top of the fiber) was 1.055 mm, the same as the splitter unit, and the stacking pitch was 1.06 mm. In other words, the thickness of the adhesive layer between the optical fiber array units was 5 μm. In addition, a single-layer (one-dimensional) optical fiber array having four cores with a pitch of 1.06 mm was fabricated. The end face thereof was polished to be angled 8° so as to be parallel to the end face of the two-dimensional splitter when it is connected thereto (that is, in a direction of arrangement of optical fibers of the one-dimensional optical fiber array). These three were aligned with each other, connected to each other, and fixed to each other as in the case of a typical waveguide splitter module to provide a two-dimensional splitter module.

Although the two-dimensional splitter module fabricated in this example had a connection loss of 0.5 dB and a return loss of 60 dB, which are a little larger than those for a one-dimensional splitter module, the two-dimensional splitter module had characteristics suitable for practical use.

As described above, the present invention can provide an inexpensive two-dimensional optical element array which has superior reflection characteristics of end faces from which light is outgoing or incoming of optical elements on a substrate, and can maintain the superior reflection characteristics for a long period and prevent a loss of quantity of light and an adverse effect to another device, a two-dimensional waveguide apparatus having high density and capacity and allowing the number of steps in packaging or connection to be reduced, and efficient methods for manufacturing them.

What is claimed is:

1. A two-dimensional optical element array comprising a two-dimensional integrated body or two-dimensional stack of a plurality of sets of an optical element and a substrate, the substrate having one or more grooves formed on a surface thereof, each said groove being suited to a profile of one or more optical elements aligned and fixed in the grooves;

wherein at least one of an end face from which light is outgoing and an end face from which light is incoming of each optical element is slanted by a predetermined angle (θ) with respect to a plane perpendicular to a central axis of said optical element.

2. The two-dimensional optical element array according to claim 1, wherein the two-dimensional optical element array comprises a stack of optical element array units, each said unit comprising a set of said optical element and said substrate.

3. The two-dimensional optical element array according to claim 2, further comprising a fixing member positioned on one surface of a substrate of an uppermost unit and between said substrates of adjacent ones of said units, such that said fixing member presses or mounts said optical element against or on one surface of said substrate having said grooves for alignment and fixing.

4. The two-dimensional optical element array according to claim 3, further comprising an adhesive layer between surface of said fixing member and another surface of said substrate of said unit that faces said surface of the fixing member.

5. The two-dimensional optical element array according to claim 4, wherein a thickness of said adhesive layer is in a range of 2 to 100 μm.

6. The two-dimensional optical element array according to claim 3, wherein said optical element is pressed against or mounted on said substrate such that said optical element abuts a surface of said fixing member and a side wall of said groove.

7. The two-dimensional optical element array a according to claim 2, wherein an apex of said optical element arranged on said substrate of one of said optical element array units is brought into contact with a surface of a substrate of an adjacent one of said units facing thereto, such that the facing surfaces of the substrates of said two adjacent units do not directly contact each other and such that said two adjacent two units do not have a direct mechanical influence on each other.

8. The two-dimensional optical element array according to claim 2, further comprising an adhesive layer interposed between and contacting an apex of said optical element arranged on said substrate of one of said units and a surface of said substrate of an adjacent one of said units facing thereto, wherein the facing surfaces of the substrates of said two adjacent units do not directly contact each other, and wherein said two adjacent units do not have a direct mechanical influence on each other.

9. The two-dimensional optical element array according to claim 1, wherein at least one of the end face from which light is outgoing and the end face from which light is incoming of each said optical element is disposed in said plane perpendicular to the central axis of said optical element.

10. The two-dimensional optical element array according to claim 1, wherein at least one of the end face from which light is outgoing and the end face from which light is incoming of each said optical element is disposed in a plane angled by a predetermined angle (θ) with respect to said plane perpendicular to the central axis of said optical element.

11. The two-dimensional optical element array according to claim 1, wherein at least one of the end face from which light is outgoing and the end face from which light is incoming of each said optical element is disposed in a plane perpendicular to an optical axis of one of an outgoing light and an incoming light, respectively.

12. The two-dimensional optical element array according to claim 1, wherein said optical elements comprise one of an optical fiber and a lens.

13. The two-dimensional optical element array according to claim 1, wherein a positioning guide is formed in a predetermined position on the surface of said substrate having said grooves.

14. The two-dimensional optical element array according to claim 1, wherein said grooves comprise V-shaped grooves.

15. A method of manufacturing a two-dimensional optical element array, comprising:
 aligning and fixing one or more optical elements on a substrate having one or more grooves on one surface thereof, each said groove being suited to a profile of said optical elements; and
 integrating or stacking a plurality of sets of said substrate and said optical elements to provide a two-dimensional configuration;
 wherein at least one of an end face from which light is outgoing and an end face from which light is incoming of each said optical element is slanted by a predetermined angle ($\theta$) with respect to a plane perpendicular to a central axis of said optical element.

16. The method of manufacturing the two-dimensional optical element array according to claim 15, wherein at least one of the end face from which light is outgoing and the end face from which light is incoming of each said optical element is disposed in the plane perpendicular to the central axis of said optical element.

17. The method of manufacturing the two-dimensional optical element array according to claim 15, wherein at least one of the end face from which light is outgoing and the end face from which light is incoming of each said optical element is disposed in a plane angled by a predetermined angle ($\theta$) with respect to the plane perpendicular to the central axis of said optical element.

18. The method of manufacturing the two-dimensional optical element array according to claim 15, wherein at least one of the end face from which light is outgoing and the end face from which light is incoming each said optical element is disposed in a plane perpendicular to one of an optical axis of an outgoing light and an incoming light, respectively.

19. A two-dimensional waveguide apparatus, comprising:
 a two-dimensional integral body or two-dimensional stack of a plurality of waveguide substrate units each having one or more waveguides patterned a planar manner;
 wherein at least one of an end face from which light is outgoing and an end face from which light is incoming of each said waveguide of each said waveguide substrate unit is slanted by a predetermined angle ($\theta$) with respect to a plane perpendicular to a central axis of said waveguide.

20. The two-dimensional waveguide apparatus according to claim 19, further comprising an adhesive layer between surfaces of two adjacent waveguide substrate units of said plurality of waveguide substrate units that face each other.

21. The two-dimensional waveguide apparatus according to claim 20, wherein a thickness of said adhesive layer is in a range of 2 to 100 $\mu$m.

22. The two-dimensional waveguide apparatus according to claim 19, wherein at least one of the end face from which light is outgoing and the end face from which light is incoming of each said waveguide of said waveguide substrate unit is disposed in a plane perpendicular to an optical axis of one of an outgoing light and an incoming light, respectively.

23. The two-dimensional waveguide apparatus according to claim 19, wherein at least one of the end face from which light is outgoing and the end face from which light is incoming of each said waveguide of said waveguide substrate unit is disposed in a plane perpendicular to a central axis of said waveguide.

24. The two-dimensional waveguide apparatus according to claim 19, wherein at least one of the end face from which light is outgoing and the end face from which light is incoming of said waveguide of each said waveguide substrate unit is disposed in a plane angled by a predetermined angle ($\theta$) with respect to said plane perpendicular to the central axis of said waveguide.

25. The two-dimensional waveguide apparatus according to claim 19, further comprising a positioning guide formed at a predetermined location on a surface of said waveguide substrate unit.

26. A method of manufacturing a two-dimensional waveguide apparatus, comprising a step of integrating or stacking a plurality of waveguide substrate units each having one or more waveguides patterned in a planar manner to provide a two-dimensional configuration;
 wherein at least one of an end face from which light is outgoing and an end face from which light is incoming of each said waveguide is slanted by a predetermined angle ($\theta$) with respect to a plane perpendicular to a central axis of said waveguide.

27. The method of manufacturing the two-dimensional waveguide apparatus according to claim 26, wherein at least one of the end face from which light is outgoing and the end face from which light is incoming of each said waveguide of each said waveguide substrate unit is disposed in a plane perpendicular to a central axis of said waveguide.

28. The method of manufacturing the two-dimensional waveguide apparatus according to claim 26, wherein at least one of the end face from which light is outgoing and the end face from which light is incoming of each said waveguide of each said waveguide substrate unit is disposed in a plane angled by a predetermined angle ($\theta$) with respect to said plane perpendicular to the central axis of said waveguide.

29. The method of manufacturing the two-dimensional waveguide apparatus according to claim 26, wherein at least one of the end face from which light is outgoing and the end face from which light is incoming of each said waveguide of said waveguide substrate unit is disposed in a plane perpendicular to an optical axis of one of an outgoing light and an incoming light, respectively.

* * * * *